United States Patent [19]

Farnam

[11] Patent Number: 4,545,593

[45] Date of Patent: Oct. 8, 1985

[54] ENHANCED MOBILITY WHEELCHAIR

[76] Inventor: Jeffrey R. Farnam, 3035 Humboldt Ave. S., Minneapolis, Minn. 55408

[21] Appl. No.: 549,247

[22] Filed: Nov. 4, 1983

[51] Int. Cl.[4] .............................................. B62M 1/14

[52] U.S. Cl. ........................... 280/242 WC; 280/250; 297/DIG. 4

[58] Field of Search ............... 280/242 WC, 289 WC, 280/650, 647, 249, 250, 242 R, 251, 5.28; 180/907, 8.2, 6.5; 297/DIG. 4

[56] References Cited

U.S. PATENT DOCUMENTS

| | | | |
|---|---|---|---|
| 1,336,935 | 4/1920 | Wakefield | 280/242 R |
| 2,436,619 | 2/1948 | Swindell | 280/211 |
| 2,751,027 | 6/1956 | McLaughlin | 180/6.5 X |
| 2,765,860 | 10/1956 | Church | 180/6.4 |
| 3,049,364 | 8/1962 | Clay | 280/5.28 X |
| 3,848,883 | 11/1974 | Breacain | 280/5.32 |
| 4,077,483 | 3/1978 | Randolph | 180/6.5 |
| 4,119,163 | 10/1978 | Ball | 180/8.2 X |
| 4,209,073 | 6/1980 | Enix | 280/242 WC X |
| 4,258,815 | 3/1981 | Wier et al. | 180/6.48 |
| 4,375,295 | 3/1983 | Volin | 280/289 WC |

*Primary Examiner*—Joseph F. Peters, Jr.
*Assistant Examiner*—Charles R. Watts
*Attorney, Agent, or Firm*—Merchant, Gould, Smith, Edell, Welter & Schmidt

[57] ABSTRACT

Enhanced mobility wheelchair is disclosed. A seat and frame supporting the seat includes a base portion and a seat supporting portion maintained in a space relationship by a plurality of spacing numbers. A pair of back rest supporting members extend from the rear base portion of the frame upward past the seat supporting portion and have a back rest supported therebetween. A pair of right and left rear wheels are independently and rotatably mounted on opposite sides of the frame near the base portion thereof and a pair of right and left front wheels are independently and rotatably mounted near the base portion of the frame at the front thereof. Each wheel includes a coaxially mounted sprocket and the same sided wheels are connected with an endless chain over the sprockets to cause the wheels to turn in unison. The front and rear wheels are sized to permit a user to propel the wheelchair from the rear wheels when in an upright normal position and from the front wheels when in a forward leaning position in either case by grasping and turning the wheels. By leaning backward the user may shift the center of gravity of the wheelchair backwards to momentarily disengage the front wheels and rotate the wheelchair about the rear wheels. Optionally the wheelchair may be fitted with a pair of castor wheels to support the rear thereof with the rear wheels off the ground to provide improved maneuverability when operating the wheelchair on hard and flat surfaces and to raise the user to a more conventional wheelchair height.

8 Claims, 4 Drawing Figures

ENHANCED MOBILITY WHEELCHAIR

TECHNICAL FIELD OF THE INVENTION

The present invention generally pertains to wheelchairs for the disabled and more particularly to a user-propelled enhanced mobility wheelchair for use by paraplegic individuals.

BACKGROUND OF THE INVENTION

Wheelchairs have long provided an efficient and practical means for mobilizing disabled individuals, particularly parapelgic individuals. The conventional or typical wheelchair in use at this time includes a seat assembly supported by a frame which in turn is supported by a pair of main rear wheels of usually relatively large diameter and a pair of caster-like front wheels of relatively small diameter. The main or rear wheels are independently mounted to enable a seated user to propel and maneuver the wheelchair with the arms and hands. While conventional wheelchairs of this nature have been found well suited for use in obstacle free environments, they have been found generally inadequate for use in natural surrounds, for example over rough or disintegrated surfaces.

In recognition of the limited usefulness of conventional wheelchairs efforts have been made to provide alternative designs which are capable of traversing common obstacles such as steps or stairs or rough terrain. For example, U.S. Pat. No. 2,751,027, U.S. Pat. No. 4,077,483 and U.S. Pat. No. 4,119,163 each disclose wheelchairs capable of traversing obstacles such as curbs. While each of the wheelchairs disclosed in said patents perhaps provide enhanced mobility for the user in certain situations, they are characterized by complex designs requiring a source of power other than that provided by the user. Accordingly, these wheelchairs are relatively heavy and cumbersome, so that they cannot be conveniently transported for example in the trunk of a car, and in addition have a limited range which makes then unsuitable for extended outdoor use. Moreover, the relative complexity of these wheelchairs makes them prohibitively expensive for many individuals.

As a need for an enhanced mobility user-propelled wheelchair of lightweight and uncomplicated design still exists, the present invention is provided. As will be seen from the ensuing drawing and description, the present invention fulfills a long felt need of parapelgic individuals for a practical and versatile wheelchair capable of extending their range of mobility into the natural environment.

SUMMARY OF THE INVENTION

The present invention provides a user-propelled wheelchair of an uncomplicated and lightweight design for use over rough and disintegrated surfaces often found in natural surrounds. The wheelchair provides a seat supported on a frame with right and left rear wheel axially mounted on opposite sides of the frame near the rear thereof. Right and left front wheels are similarly axially mounted on opposite sides of the frame near the front thereof. Right and left means for interconnecting the front and rear wheels on the respective right and left sides are provided to cause same sided front and rear wheels to turn in unison, with each of the wheels sized to enable a seated user to propel and maneuver the wheelchair from the front or the rear wheels.

According to another aspect of the invention, the means for interconnecting the front and rear wheels includes coaxial sprockets on said wheels and an endless chain sized to extend around the sprockets whereby force is transferred between said wheels to cause them to turn in unison.

According to yet another aspect of the invention the wheels are positioned relative to the seat and frame such that in a normal upright position the user may conveniently propel and maneuver the wheelchair from the rear wheels and such that the user may lean forward to propel the wheelchair from the front wheels while at the same time shifting the center of gravity of the chair and user toward the front of the chair. According to still another aspect of the invention, the user may lean back in the chair to shift the center of gravity rearward thereof wherein the downward force of the front wheels may be relieved momentarily and the chair more easily directed to the right or left.

According to yet another aspect to the invention, means are provided for adjusting the longitudinal mounting position of the wheels to the chair whereby the relative center of gravity thereof may be adjusted. According to still another aspect to the invention, means are provided for adjusting the vertical mounting position of the front and rear wheels and the chair and the wheels are provided with knobby treads to improve traction on slippery or disintegrated surfaces.

According to still another aspect of the invention a pair of right and left caster wheels and means for selectively mounting the wheels under the frame near the rear thereof are provided whereby the rear of the chair may be supported by the casters instead of the right and left rear wheels and whereby the chair may be made more maneuverable for use on flat smooth surfaces and whereby the seat is elevated to a conventional height more compatable with tables, furniture etc.

DETAILED DESCRIPTION OF THE INVENTION

Figure 1:
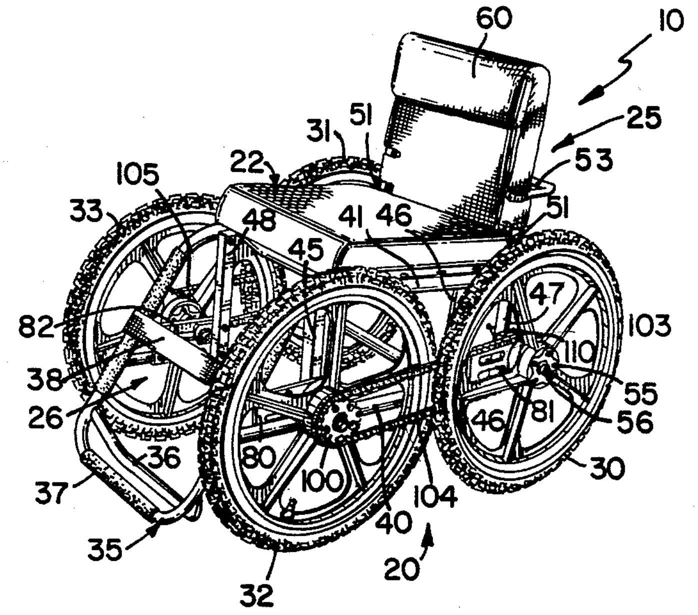
FIG. 1 is a perspective view of the wheelchair according to the present invention.

With reference to FIGS. 1–4 a detailed description of the invention will now be given. The wheelchair 10 includes a frame assembly 20 suspended over the ground with independently and rotatably mounted left and right rear wheels 30 and 31 respectively, and left and right front wheels 32 and 33 respectively. Each of wheels 30–33 are mounted to rotate in a fixed longitudinal plane, i.e. they are not steerable. Preferably, wheels 30–33 are treaded with knobbies to improve traction on rough, disintegrated or slippery surfaces. A cushioned seat 22 is disposed atop frame assembly 20 and extends between a rear end 25 and a front end 26 of frame assembly 20. A leg and foot support 35 extends forward and down from the top and front 26 of assembly 20 and includes a foot rest portion 36 and 37 and a fabric leg rest 38.

Frame assembly 20 includes a base portion 40 and a seat support portion 41 maintained in a spaced relationship by vertical frame members 45–50. Tubular members 47 and 50 extend upwardly beyond the top portion 41 of frame assembly 20 and have disposed therebetween a fabric back rest portion 60. Brackets 51 and 52 are connected between the respective members 47 and 50 to top portion 41 on opposite sides of the chair to assist in maintaining members 47 and 50 in a fixed relationship with the rest of frame assembly 20. A push or pull bar 53 is connected between members 47 and 50 to assist in maintaining said members in a fixed spaced relationship and to provide means by which the chair may be pushed or pulled. Preferably, the members and portions of frame assembly described herein are constructed from lightweight tubular metals, although, however, other materials with similar qualitites of strength and weight may be used.

Wheels 30–33 each include a conventional ball bearing hub and axle for instance hub 55 and axle 56 shown with respect to wheel 31. Slotted mounting brackets 80 and 82 are mounted on opposite sides of frame assembly 20 between the respective members 45 and 48 and base portion 40, and receive the respective axles of wheels 32 and 33, which are in turn secured to brackets 80 and 82 by threaded nuts. Similarly, brackets 81 and 83 are secured between the respective members 46 and 47 and 49 and 50 on opposite sides of frame 20 whereby the respective wheels 30 and 31 may be mounted. Brackets 80–83 each have two vertically spaced horizontal slots so that wheels 30–33 may be mounted in either of two vertically displaced positions although, however, this is an optional feature of the invention and only one slot need be provided.

Each of wheels 30–33 further includes a toothed sprocket, 100–103 respectively, mounted coaxially therewith, in a fixed relationship with the hubs thereof. Endless chains 104 and 105 are provided to rotatably link the respective wheel pairs 30 and 32 and 31 and 33 to cause the wheels on corresponding sides of the wheelchair to turn in unison.

Figure 2:
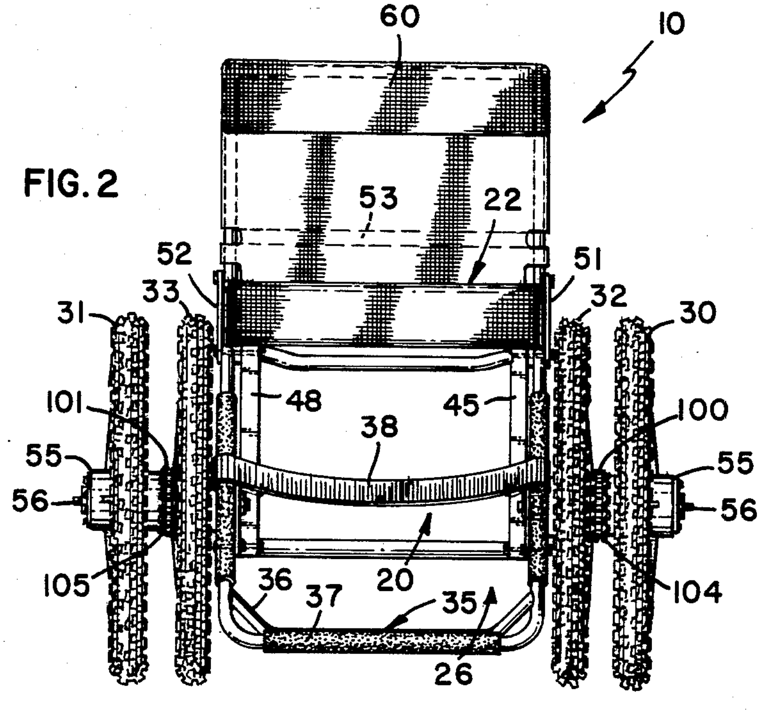
FIG. 2 is a front view of the wheelchair according to the present invention.
Figure 3:
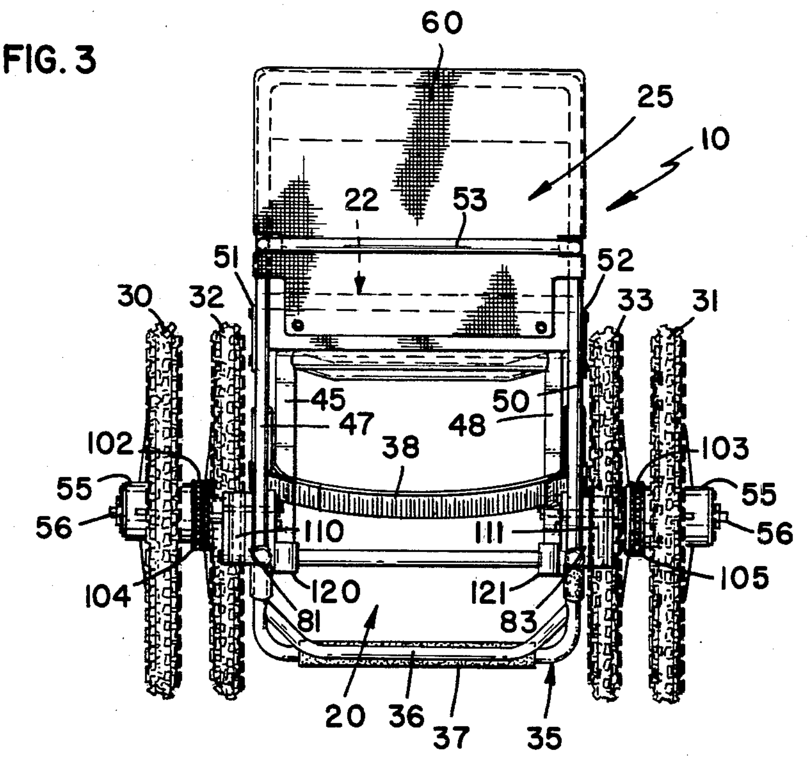
FIG. 3 is a rear view of the wheelchair according to the present invention.

As may be best seen with reference to FIGS. 2 and 3, front wheels 30, 33 and rear wheels 31, 32 are laterally displaced from one another so as to provide for a shorter wheel base than would otherwise be possible were the wheels disposed in the same lateral plane. The displacement is provided for with spacer members 110 and 111, which are connected to respective members 46 and 47 and 49 and 50 by means of nuts and bolts.

Figure 4:
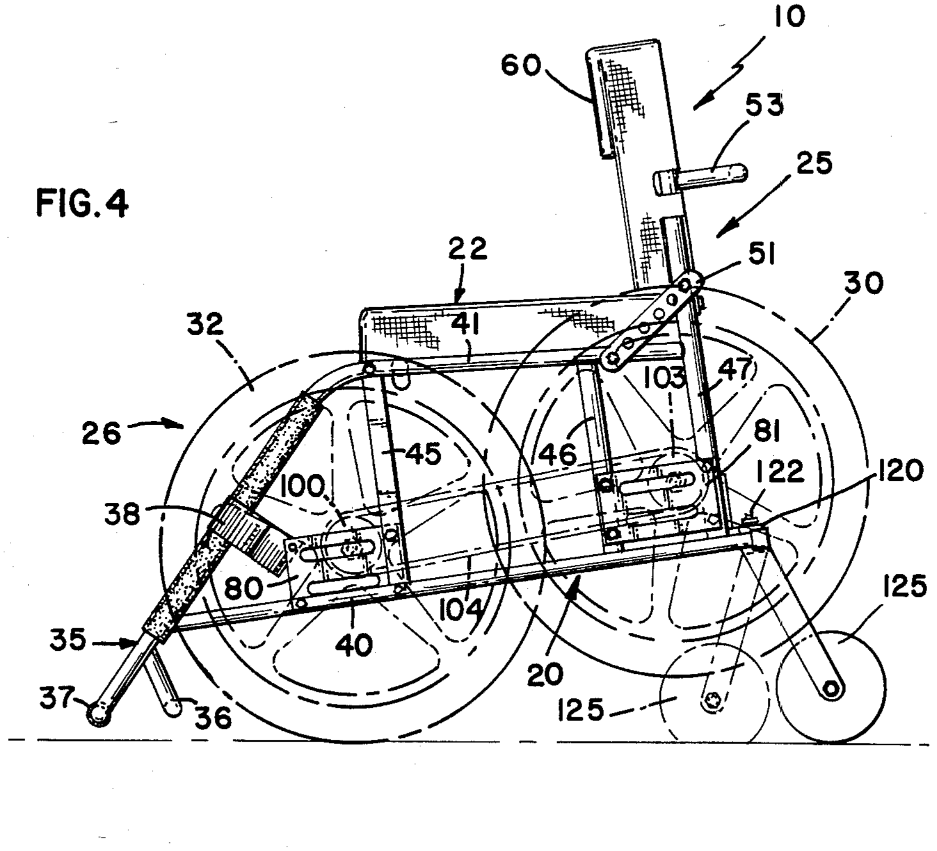
FIG. 4 is a side view of the wheelchair according to the present invention with the optional caster wheels installed.

With reference to FIGS. 3 and 4 the optional maneuverability improving caster wheels 125 may be seen. Tubular sleeves 120 and 121 are fixedly attached to opposite inner-sides of base 40 of frame assembly 20 near the rear end 25 thereof. A pair of caster wheels (only the left is shown) include near the top thereof a vertical axle member 122 which may be slipped into sleeves 120 or 121 to provide caster wheel support for the rear of the chair 10, when maneuverability or seat elevation is sought to be improved when the chair is used on hard and flat surfaces, as found indoors.

Preferably the wheels 30–33 have about a 20 inch diameter and, as illustrated, are mounted relative to the frame and seat such that all wheels are conveniently reached by the user in order to propel and maneuver the wheelchair 10 from either the front or back wheels. Although in the present embodiment all wheels 30–33 are shown as being the same size, this is not essential to the invention, so long as all four wheels are conveniently reachable by the user to provide propulsion ad so long as the wheels are interconnected so as to turn in unison.

The operation of the above-described wheelchair (without the caster installed) will now be briefly explained. A seated user in a normal upright position may propel and maneuver the wheelchair by the turning of rear wheels 30 and 31 in a manner similar to that done in a case of a conventional wheelchair, for example by rotating the wheels of one side in opposition to the wheels of the other side in order to turn. As shown in the drawing, the seat 22 is positioned relative to the front and rear wheels such that it extends substantially between a first imaginary plane orthoganol to the longitudinal axis of the wheelchair and intersecting the acles of the rear wheels to a second imaginary plane orthoganol to the longitudinal axis and intersecting the axles of the front wheels. Thus, when a user is seated upright the combined center of gravity of the user and the wheelchair is closer to the rear wheel axles than the front wheel axles. Thus, the user may momentarily relieve the traction of either or both of the front wheels 32 and 33 by shifting his weight in a suitable fashion, or leaning rearward against back rest 60 of the chair, so that the chair may more easily pivot or rotate about the rear wheels 30 and 31. Thus, using "body english" the wheelchair 10 of the present invention may accomplish tight cornering.

The wheelchair of the present invention is also particularly well adapted for hill climbing. For instance, when a steep incline is encountered a seated user may lean forward, shifting the center of gravity of the chair toward the front thereof, and propel and maneuver the chair via the front wheels 32 and 33. Thus, the user need not sacrifice position with respect to the drive wheels and thus leverage and power, as in the case of a conventional wheelchair, in order to maintain an optimum balance. Relatedly, when going downhill a user may lean backwards and simultaneously restrain the front wheels via restraint of the rear wheels. This is a notable operational advantage over conventional wheelchairs, wherein the front wheels cannot be controlled, a problem in the downhill situation in that the front wheels bear a disproportionate amount of the chairs weight and thus have a controlling influence on maneuverability, for instance braking.

As is evident from the foregoing description, the provision of four relatively large and wide treaded tires 30–33 enables the wheelchair of the present invention to traverse uneven and disintegrated surfaces, such as fields, paths or inclines, with relative ease as compared to conventional wheelchairs wherein the caster wheels become a liability, for example by impeding forward movement on rough or soft terrain and by facilitating undesirable movement on downhill inclines, as hereinbefore described. Moreover, provision of four large wheels permits the wheelchair 10 to traverse obstacles with relative ease, and the interconnection of the wheels provides four-wheel drive whereby enhance traction is provided.

Certain modifications of the embodiment of the invention disclosed herein are contemplated. For one, it is contemplated that the sprocket and chain members may be disposed inside the frame generally under the seat wherein the track of the wheelchair may be narrowed. For another, it is contemplated that the leg and foot rest portion 35 may be modified to elevate it for greater ground clearance. For yet another, it is contemplated that pullies and belts or intermeshing gears may be used as an alternative to the chains and sprockets interconnecting front and rear wheels. And for yet another it is contemplated that same-sided wheels be mounted in the same lateral plane, as opposed to the offset mounting scheme disclosed herein.

While there have been described above the principles of this invention in connection with specific apparatus, it is to be clearly understood that this description is made only by way of example and not as a limitation to the scope of the invention as set forth in the claims appended hereto.

I claim:

1. A user-propelled wheelchair comprising:
a seat supported on a frame;
right and left rear wheels rotatably mounted on opposite sides of said frame near the rear thereof;
right and left front wheels rotatably mounted on opposite sides of said frame near the front thereof;
said wheels being mounted to said frame by means of adjustable brackets whereby the longitudinal mounting position of the wheels may be slideably adjusted;
right and left means for interconnecting said front and rear wheels on said right and left sides respectively, to cause same-sided front and rear wheels to turn in unison; and
each of said wheels sized to enable a seated user to propel and maneuver said wheelchair from said front or said rear wheels.

2. A user-propelled wheelchair according to claim 1 wherein said brackets include a plurality of vertically displaced longitudinally oriented mounting points whereby the vertical mounting position of the wheels may be adjusted.

3. A user-propelled wheelchair comprising:
a frame including a base portion and a seat supporting portion maintained in a vertically spaced relationship by a plurality of vertical spacing members;
a seat disposed over said seat supporting portion;
backrest support member means extending substantially vertically upward from said seat supporting portion near the rear of said frame and a backrest supported thereby;
right and left rear wheels rotatably mounted on opposite sides of said frame to said base portion near the rear thereof;
right and left front wheels rotatably mounted on opposite sides of said frame to said base portion near the front thereof;
right and left means for interconnecting said front and rear wheels on said right and left sides respectively, to cause same-sided front and rear wheels to turn in unison;
each of said wheels sized to enable a seated user to propel and maneuver said wheelchair from said front or said rear wheels; and
said backrest support member means extending upward from said seat supporting portion at a point permitting a user to lean backward against said backrest and momentarily reduce the traction of said front wheels.

4. A user-propelled wheelchair comprising:
a frame including a base portion and a seat supporting portion maintained in a vertically spaced relationship by a plurality of vertical spacing members;
a seat disposed over said seat supporting portion;
backrest support member means extending substantially vertically upward from said seat supporting portion near the rear of said frame and a backrest supported thereby;
right and left rear wheels rotatably mounted on opposite sides of said frame to said base portion near the rear thereof;
right and left front wheels rotatably mounted on opposite sides of said frame to said base portion near the front thereof;
right and left means for interconnecting said front and rear wheels on said right and left sides respectively, to cause same-sided front and rear wheels to turn in unison;
each of said wheels sized to enable a seated user to propel and maneuver said wheelchair from said front or said rear wheels; and
the same-sided front and rear wheels being laterally offset and longitudinally overlapping so that the wheel base of said wheelchair is shorter than the diameter of one of said wheels.

5. A user-propelled wheelchair comprising:
a seat supported on a frame;
right and left rear wheels rotatably mounted on opposite sides of said frame near the rear thereof;
right and left front wheels rotatably mounted on opposite sides of said frame near the front thereof;
right and left means for interconnecting said front and rear wheels on said right and left sides respectively, to cause same-sided front and rear wheels to turn in unison;
each of said wheels sized to enable a seated user to propel and maneuver said wheelchair from said front or said rear wheels; and
the same-sided front and rear wheels being laterally offset and longitudinally overlapping so that the wheel base of said wheelchair is shorter than the diameter of one of said wheels.

6. A user-propelled wheelchair comprising:
a frame including a base portion and a seat supporting portion maintained in a vertically spaced relationship by a plurality of vertical spacing members;
a seat disposed over said seat supporting portion;
backrest support member means extending substantially vertically upward from said seat supporting portion near the rear of said frame and a backrest supported thereby;
right and left rear wheels rotatably mounted on opposite sides of said frame to said base porion near the rear thereof;
right and left front wheels rotatably mounted on opposite sides of said frame to said base portion near the front thereof;
right and left means for interconnecting said front and rear wheels on said right and left sides respectively, to cause same-sided front and rear wheels to turn in unison;
each of said wheels sized to enable a seated user to propel and maneuver said wheelchair from said front or said rear wheels; and
a pair of castor wheel mounting means disposed on opposite sides of said base portion of said frame near the rear thereof and a pair of castor wheel means selectively mountable to said wheelchair at said mounting means, said castor wheel means sized to support the rear of said wheelchair with said rear wheels off the ground to provide improved maneuverability of said wheelchair on flat and hard surfaces and to provide conventional seat elevation when mounted.

7. A user-propelled wheelchair comprising:

a frame for supporting a seat, said frame having a base portion and a seat supporting portion maintained in a spaced relationship with vertical spacing members;

right and left rear wheels mounted to rotate in respective fixed longitudinal planes on opposite sides of said frame to said base portion near the rear end thereof;

right and left front wheels mounted to rotate in respective fixed longitudinal planes on opposite sides of said frame to said base portion near the front end thereof;

a seat disposed on said seat supporting portion and oriented with respect to the longitudinal axis of said wheelchair to extend substantially between a first imaginary plane orthogonal to said longitudinal axis and intersecting the axles of said rear wheels to a second imaginary plane orthogonal to said longitudinal axis and intersecting the axles of said front wheels;

right and left means for interconnecting said front and rear wheels on said right and left sides respectively to cause same-side front and rear wheels to turn in unison;

each of said wheels having a radius which is substantially the same as or greater than the length of said vertical spacing members so that the perimeter of each of said wheels extends upwardly to a height substantially adjacent said seat and so that the perimeter of said wheels may be reached by a seated user in order to propel said wheelchair; and means extending from the front of said frame for supporting the legs and feet of a user at locations below the level of said seat.

8. A user-propelled wheelchair according to claim 7 wherein said means for interconnecting said front and rear wheels includes sprocket means coaxially mounted on each of said front and rear wheels and endless chain means engaging said sprockets to cause said wheels to turn in unison.

* * * * *